United States Patent [19]

Ueda et al.

[11] 4,339,182
[45] Jul. 13, 1982

[54] CONTROL SYSTEMS FOR MICROFILM READERS

[75] Inventors: Nobuo Ueda, Kanagawa; Seiichi Yamagishi, Tokyo, both of Japan

[73] Assignee: Minolta Camera Kabushiki Kaisha, Osaka, Japan

[21] Appl. No.: 201,925

[22] Filed: Oct. 29, 1980

[30] Foreign Application Priority Data

Nov. 2, 1979 [JP] Japan .............................. 54-142476

[51] Int. Cl.³ ...................... G03B 27/48; G03B 23/08
[52] U.S. Cl. .................................... 353/27 R; 355/45
[58] Field of Search ............. 353/27 R, 27 A; 355/45, 355/55

[56] References Cited

U.S. PATENT DOCUMENTS

| 3,792,440 | 2/1974 | Murakoshi | 353/27 A |
|---|---|---|---|
| 3,841,747 | 10/1974 | Peroutky | 353/27 A |
| 3,870,413 | 3/1975 | Goebel | 353/27 A |
| 4,033,684 | 7/1977 | Toriumi et al. | 353/27 A |
| 4,086,469 | 4/1978 | Toriumi et al. | 353/27 A |
| 4,172,657 | 10/1979 | Watanabe et al. | 355/45 |
| 4,283,136 | 8/1981 | Swift et al. | 355/45 |

Primary Examiner—Steven L. Stephan
Attorney, Agent, or Firm—Watson, Cole, Grindle & Watson

[57] ABSTRACT

A microfilm reader comprising a plurality of input keys for specifying the desired frame of a microfilm, drive assemblies for automatically transporting the microfilm in response to signals from input keys to bring the specified frame to the projecting position, and a control system. Upon the application of power to the control system or change of the magnification of projection, a signal output circuit emits signals equivalent to those produced when specific input keys are depressed, to transport the microfilm automatically to a predetermined position and bring a specified frame to the projecting position without striking any input key.

13 Claims, 8 Drawing Figures

CONTROL SYSTEMS FOR MICROFILM READERS

BACKGROUND OF THE INVENTION

The present invention relates to a system for controlling microfilm readers, and more particularly to a microfilm reader control system in which the desired frame is specified by depressing input keys and then automatically transported to the projection position.

Various readers for microfilms, especially for microfiches, having such an automatic film transport function have been proposed or provided as disclosed, for example, in U.S. Pat. Nos. 3,792,440 (Makoto Murakoshi), 3,841,747 (Donald C. Peroutky et al.) 3,870,413 (Joseph Goebel) and 4,033,684 (Shiro Toriumi et al.).

For use in microfilm readers of this type, there are many kinds of microfilms including those of generally accepted standards which vary in reduction scale, size, the number of frames contained, etc. It is therefore desired that one microfilm reader be usable for at least two kinds of microfilms, but many of conventional readers are each adapted for films of a particular kind only and are accordingly extremely inconvenient for the user.

MINOLTA CAMERA Co., Ltd., assignee of this invention, has already provided a microfilm reader which includes a control circuit as shown in FIG. 3 and is thereby made usable for a microfiche A (reduction scale: 1/24) containing 63 frames in 7 rows and 9 columns as seen in FIG. 1, and also for a microfiche B (reduction scale: 1/48) containing 270 frames in 15 rows and 18 columns as shown in FIG. 2. The control circuit includes a circuit comprising voltage divider resistors $DR_1$ to $DR_{17}$ connected in series for giving at divider terminals $DT_1$ to $DT_{18}$ divider signals of stepwise varying voltages as frame specifying signals corresponding in number to the maximum number of frames arranged in the direction of the rows of the films A and B (hereinafter referred to as "X direction") to move the films in this direction. With the film B having the larger number of frames, all the frames can be specified through the terminals $DT_1$ to $DT_{18}$, while the frames of the film A with the smaller frame number are specified through the terminals $DT_1$ to $DT_9$ with the other terminals $DT_{10}$ to $DT_{18}$ short-circuited by closing a short switch SS. (FIG. 3 shows the arrangement for specifying the frame column numbers arranged in X direction. The frame rows arranged in Y direction are specified by a substantially similar circuit, which therefore will not be described.)

The control circuit further includes a circuit comprising lock-type mechanical coupling switches $CS_1$ to $CS_{18}$ which are connected in series and connectable to the divider terminals $DT_1$ to $DT_{18}$ respectively and which are so adapted that when one switch is closed, another switch already closed is turned off. The desired divider signal is drawn off by selectively turning on the corresponding one of the switches $CS_1$ to $CS_{18}$, and is compared in a comparator CO with the output of a potentiometer PM which is coupled to a film carrier for emitting a signal indicating the present position of the film. Until the output of the comparator CO becomes zero upon the output of the potentiometer PM matching the divider signal, a carrier drive motor CM is driven positively or reversely to place the specified frame in position for projection by moving the film A or B.

On the other hand, as disclosed in the above-mentioned U.S. patents, microfilm drive control systems have been provided in recent years in which the drive means is controlled in response to input to a key device of the non-lock (self-return) type through a memory circuit comprising IC or LSI elements.

The use of IC, LSI or like elements appears promising for controlling mechanical apparatus for a wide variety of functions with ease and improved accuracy without necessitating a circuit of complex construction. Such an electronic circuit, although thus advantageous if used, nevertheless involves difficulties in handling signals when a lock-type key device is used which has the same circuit as is shown in FIG. 3, so that when power is temporarily turned off and thereafter turned on, or when the magnification of projection is changed, the electronic circuit is unable to locate the film specifically unless a signal specifying the position of the film is fed to the memory circuit in one form or another. Consequently there is the need for the user to manually place the film in position, or to strike a special initial key, hence very cumbersome.

To specify the position of the film in such an initial state, it is most desirable to project an index frame provided on the film, but the conventional apparatus is extremely inconvenient since the user must locate the index frame manually or by striking a specific key every time power is applied or the magnification of projection is changed. Partly because only a few of conventional readers are adapted for use with at least two kinds of microfilms, none of the known readers are provided with means for specifying the position of the film upon changing the magnification.

SUMMARY OF THE INVENTION

The main object of this invention is to provide a system for controlling microfilm readers which includes a key assembly of the non-lock type mentioned above and electric memory circuits and which is adapted to automatically project an index frame or like specific frame invariably when power is turned on or the magnification of projection is changed, whereby the drawback of the conventional apparatus can be overcome.

When power is turned on or the magnification of projection is changed in a microfilm reader of the present invention, a specific frame, such as an index frame, of the film to be projected at a magnification setting is invariably brought to the projecting position. Consequently the desired frame can be projected or printed easily and quickly without necessitating the cumbersome procedure to be conventionally followed for the particular kind of film concerned for locating the index frame with respect to both X and Y directions by striking specific keys in a group of many keys to project the index frame when the power is turned on or the magnification is changed.

Other objects and features of the present invention will become more apparent from the following description.

DESCRIPTION OF THE PREFERRED EMBODIMENT

Figure 1:
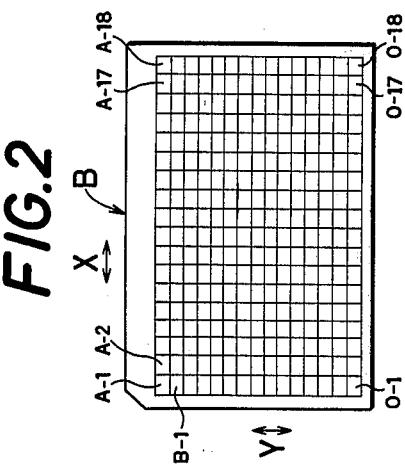
FIGS. 1 and 2 are front views showing microfiche films containing different numbers of frames.
Figure 2:
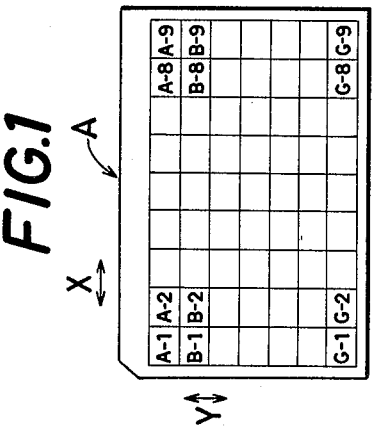
Figure 3:
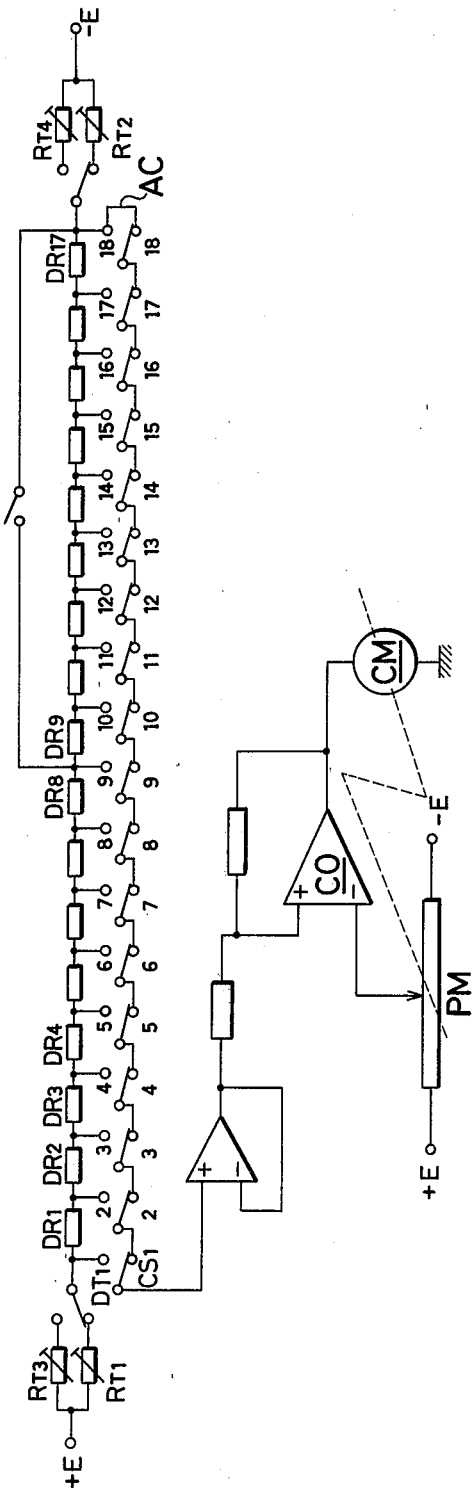
FIG. 3 is a diagram showing the control circuit of a conventional system.
Figure 4:
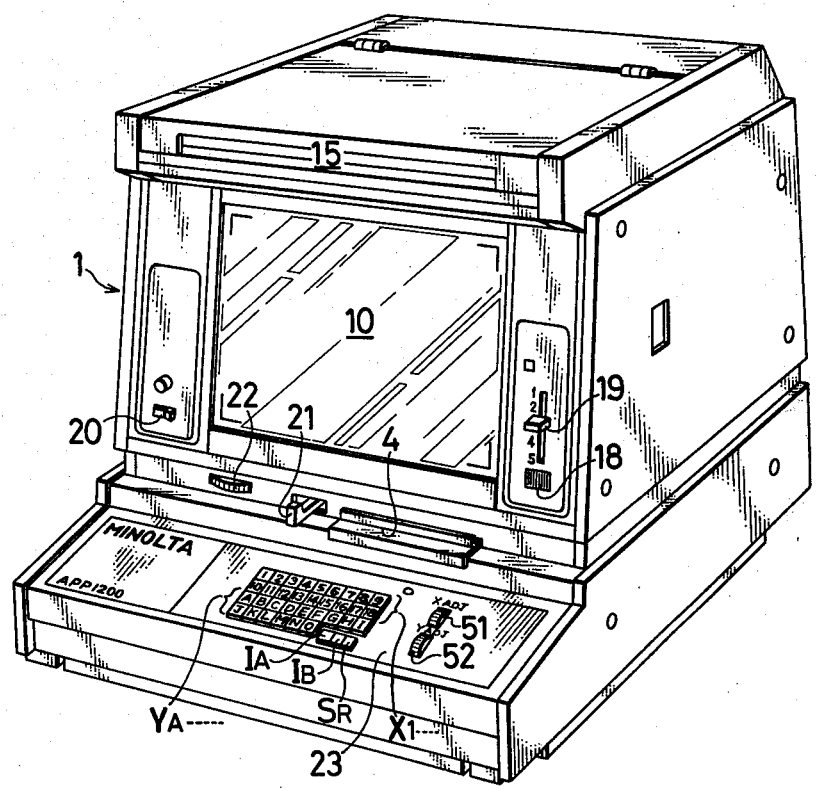
FIG. 4 is a perspective view showing the appearance of a microfilm reader embodying this invention.
Figure 5:
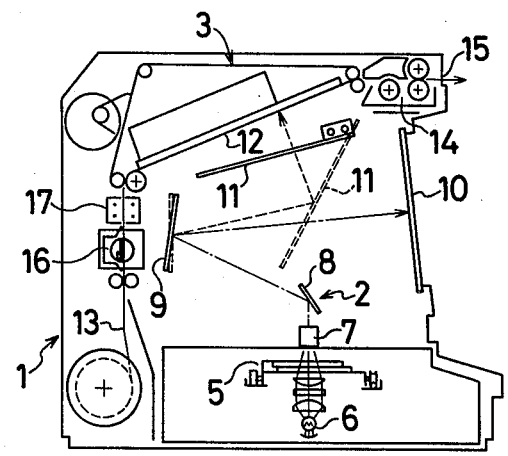
FIG. 5 is a sectional view showing the interior construction of the same.

With reference to FIGS. 4 to 8, the main body 1 of a microfilm reader houses a projector system 2 and a printer system 3 including some elements of the system 2 as its components. The film A or B shown in FIG. 1 or 2 is inserted into a film inlet 4 on the front side of the main body 1, automatically placed on a film carrier 5 and illuminated with a light source 6 below the carrier 5, whereby one frame in the projecting position of the film A or B is projected by a projection lens 7 and mirrors 8, 9 onto a screen 10 on the front side of the main body 1 above the film inlet 4. The frame can be projected also onto photosensitive paper 13 conveyed to an exposure deck 12 when a movable change-over mirror 11 is positioned in the path of the light from the projector system 2 as indicated in broken lines in FIG. 5 with the mirror 9 slightly turned. The paper 13 exposed on the deck 12 is passed through a developing unit 14 and discharged from a paper outlet 15 on the front side of the main body 1 above the screen 10. Since the paper 13 is in the form of a roll, the reader includes a cutter 16 for cutting off a piece of paper for each exposure with suitable timing. The cutter need not be provided unless the roll of paper is used. The reader further includes a charger 17 for sensitizing the paper 13 which has a photoelectroconductive layer. The paper can be exposed and developed by various methods.

The mirror 9 and the movable change-over mirror 11 are moved to the broken-line positions upon turning on a print switch 18 disposed on the front side of the main body 1 to the right of the screen 10. After the completion of the movement of the mirrors 9 and 11, the printer is started. Indicated at 19 is a lever disposed above the switch 18 for adjusting the amount of exposure, at 20 a power supply switch on the left side of the screen 10, at 21 a lever on the left side of the film inlet 4 for changing the magnification of projection in corresponding relation to the reduction scales of the films A and B, and at 22 a focusing dial on the left side of the lever 21.

Extending forward from the front side of the main body 1 below the film inlet 4 is a keyboard 23 for specifying the frame to be projected, whereby the film carrier 5 is operated to bring the desired frame to the projecting position for viewing or printing. The keyboard 23 is provided as properly arranged with non-lockable input keys X1 to X18 and YA to YO corresponding respectively in number to the number of columns and the number of rows in the film containing the larger number of frames. The keyboard 23 further has index switches IA and IB for shifting to the projecting position the index frames G-9 and O-18 of the films A and B shown in FIGS. 1 and 2, and a return switch SR for discharging the film from the carrier 5 through the film inlet 4.

Figure 6:
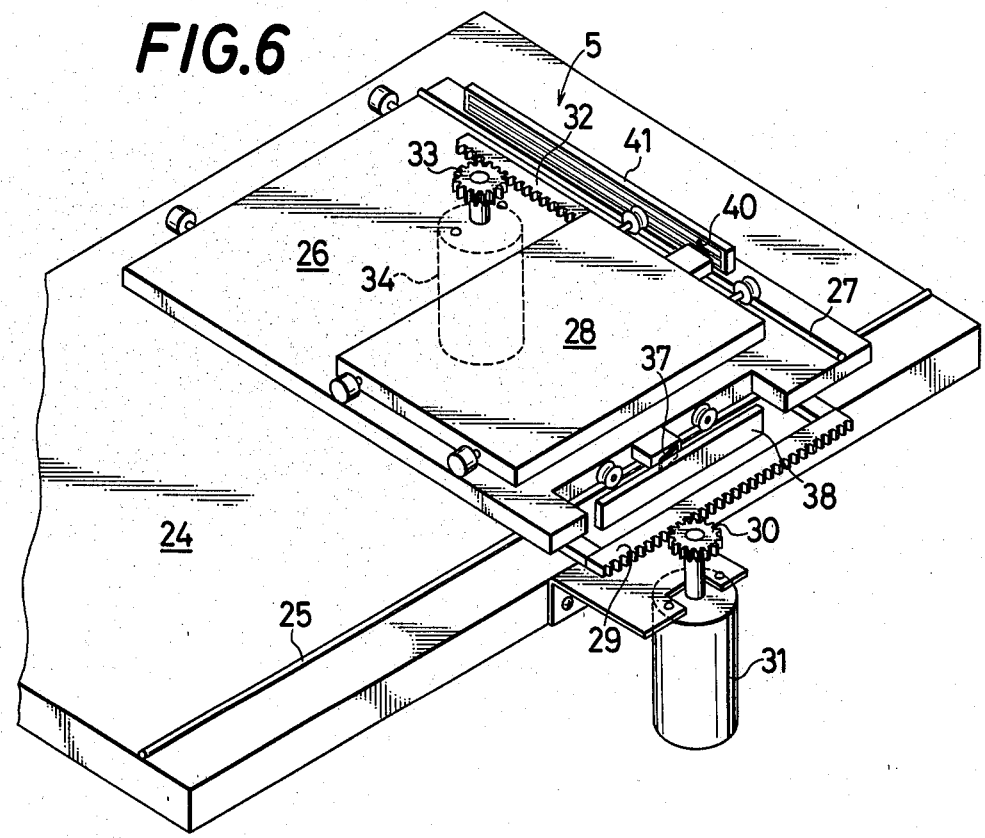
FIG. 6 is a perspective view showing a film carrier.

As seen in FIG. 6, the film carrier 5 comprises an X carriage 26 movable on a base 24 in X direction by being guided by a rail 25, a Y carriage 28 movable on the carriage 26 in Y direction by being guided by a rail 27, a drive motor 31 having a drive gear 30 in mesh with a rack 29 on the X carriage 26 for moving the X carriage 26 in X direction, and a drive motor 34 having a drive gear 33 in mesh with a rack 32 on the Y carriage 28 for moving the carriage 28 in Y direction, whereby the film A or B placed on the carriage 28 is movable in both X and Y directions to bring the desired frame to the projecting position.

Figure 7:
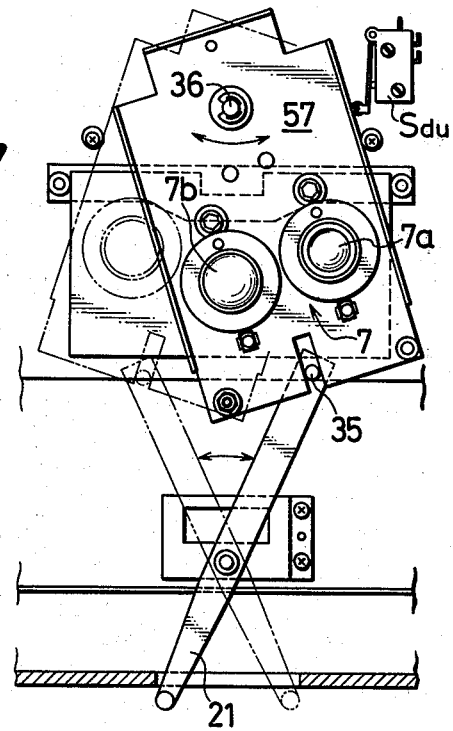
FIG. 7 is a plan view showing means for changing the magnification of projection.

In corresponding relation to the films A and B on different reduction scales, the projection lens 7 comprises a 24X projection lens 7a for the film A and a 48X projection lens 7b for the film B which are mounted on a turret 57 as shown in FIG. 7. By the magnification changing lever 21 connected as at 35 to the turret 57, the turret 57 is turnable about a pivot 36 to the solid-line position to locate the 48X projection lens 7b in the projecting position, or to the broken-line position to locate the 24X projection lens 7a in the projection position.

Figure 8:
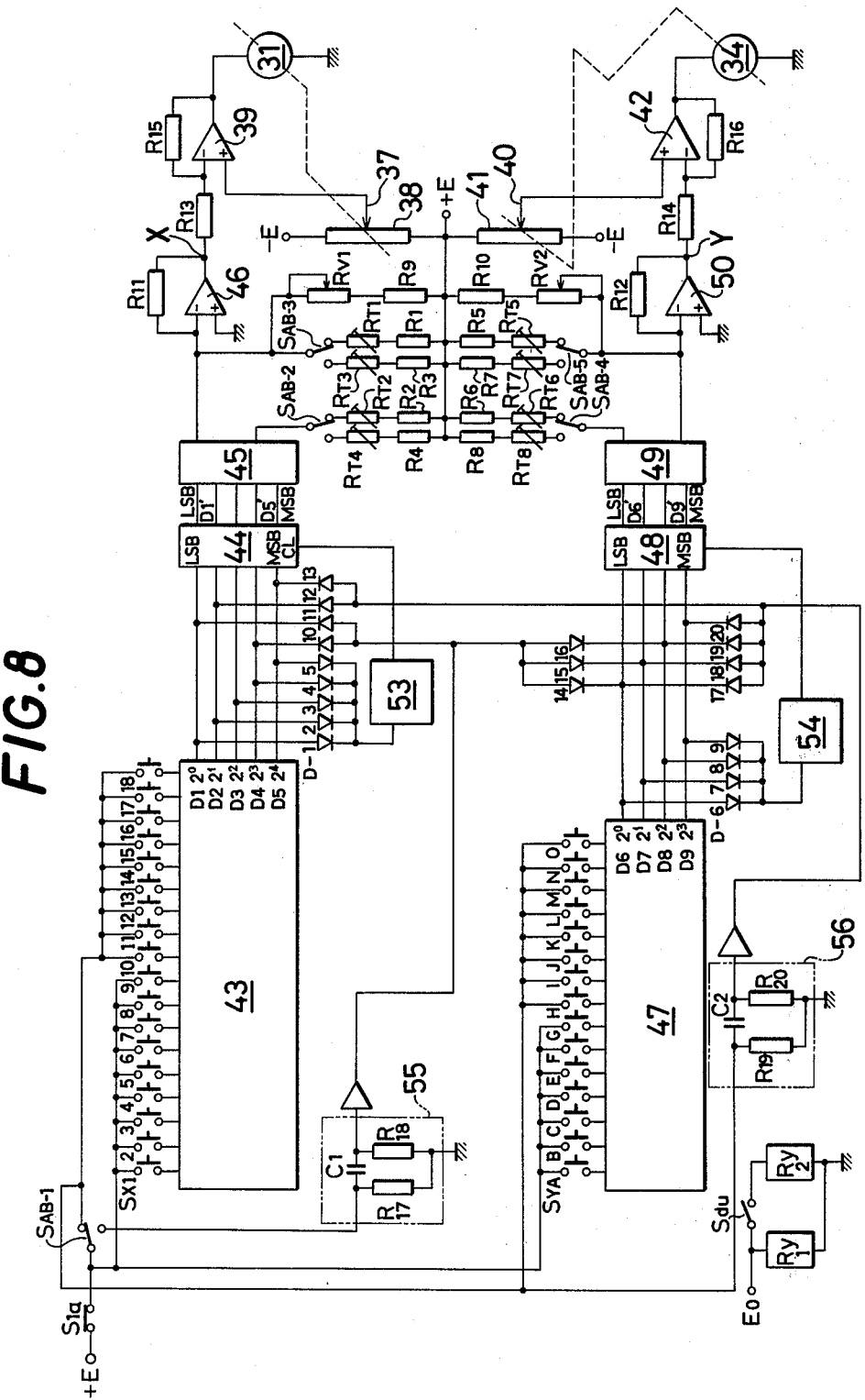
FIG. 8 is a diagram showing the control circuit of an embodiment of the invention.

The film A or B on the film carrier 5 is moved in X and Y directions in accordance with the particular frame pitch, number of frames, etc. in conformity with the reduction scale of the film to bring the desired frame to the projecting position. FIG. 8 shows a system for controlling the operation of means for driving the film carrier 5 for this purpose.

For the motor 31 for driving the carrier 5 in X direction, there is provided a potentiometer 38 having a slider 37 attached to the X carriage 26 and thereby indirectly coupled to the motor 31. The potentiometer 38 produces an output signal in accordance with the present position of the carriage 26, i.e. the position of the film with respect to X direction. The position signal and a signal specifying the desired frame with respect to X direction are fed to a comparator 39 for comparison. The resulting positive or negative output from the comparator 39 drive the motor 31 positively or reversely. The motor 31 is stopped when the output from the comparator 39 reduces to zero. In this way, the film is moved in X direction to bring the frame to the projecting position.

For the motor 34 for driving the carrier 5 in Y direction, a potentiometer 41 is provided which has a slider 40 attached to the Y carriage 28. A comparator 42 for receiving a Y direction position signal from the potentiometer and a signal specifying the desired frame with respect to Y direction gives an output signal for positively or reversely driving the motor 34 to move the film in Y direction and bring the desired frame to the projecting position in the same manner as in X direction.

The frame specifying signal with respect to X direction is emitted by the corresponding one of non-lock key switches SX1 to SX18 equal in number to the maximum number of frames arranged in X direction and contained in the film A or B. The signal is fed through a decimal-binary converting matrix circuit 43 to a latching 44 and stored therein until the next signal is applied thereto. The latching 44 gives its output to a digital-analog converter circuit 45, which in turn applies a current signal to a current-voltage converter circuit 46, in which the signal is converted to a voltage signal. The signal is fed to the comparator 39.

When the film A is inserted into the reader, the switches SX10 to SX18 included in the switches SX1 to SX18 and used for the film B of the larger frame number are turned off by a change-over switch SAB-1 which is operated when one of the films A and B is inserted in place of the other, to avoid an improper operation that would result when some of the unnecessary switches SX10 to SX18 are depressed. While the switches SX1 to SX9 are used commonly for both the films A and B, the signals thereby given to the comparator 39, if at the same voltage level for the films A and B, are unable to move the films A and B over proper distances which differ in corresponding relation to the difference in the pitch of frames between the films A and B, so that two sets of resistors R2, RT2 and R4, RT4 for giving different adjusting currents to the digital-analog converter circuit 45 are provided for the films A and B respectively. One of these two sets of resistors is alternatively connected to the circuit 45 by a change-over switch SAB-2 operatively connected to the change-over switch SAB-1. The circuit connecting the output of the digital-analog converter circuit 45 to the current-voltage converter circuit 46 is provided with two sets of resistors R1, RT1 and R3, RT3 for giving adjusting voltages. One of these sets is alternatively connected to that circuit by another change-over switch SAB-3 coupled to the switch SAB-1. Thus potential variations are available at a point X for moving the films A and B over proper distances individually. The resistors RT1 to RT4 are variable resistors for finely adjusting the potential variations at the point X in agreement with the voltage variations of the potentiometer 38. A variable resistor RV1 is provided for the fine adjustment of the shift of the film in X direction.

The frame specifying signal with respect to Y direction, like that in respect of X direction, is fed to the comparator 42. Non-lock key switches SYA to SYO for specifying the desired frame with respect to Y direction correspond in number to the maximum number of frames contained in the frame A or B and aligned in Y direction. The switches SYM to SYO to be used for the film B only are turned on and off by the change-over switch SAB-1 simultaneously with the switches SX10 to SX18. Indicated at 47 is a decimal-binary converting matrix circuit for receiving signals from the switches SYA to SYO, at 48 a latching for receiving signals from the circuit 47, at 49 a digital-analog converter circuit, and at 50 a current-voltage converter circuit provided between the circuit 49 and the comparator 42. One of two sets of resistors R6, RT6 and R8, RT8, as well as R5, RT5 and R7, RT7, is alternatively used for the film A or B in corresponding relation thereto. A change-over switch SAB-4 is provided for the sets of resistors R6, RT6 and R8, RT8, and another change-over switch SAB-5 for the other sets of resistors. These switches are operatively connected to the change-over switches SAB-1 to SAB-3.

The resistors RT5 to RT8 are variable resistors for finely adjusting the potential variations at a point Y. A variable resistor RV2 is adapted for the fine adjustment of the shift of the film in Y direction.

The frame specifying switches SX1 to SX18 and SYA to SYO are operated by the non-lock keys X1 to X18 and YA to YO, respectively, on the keyboard 23. Arranged on the right side of these keys are X, Y fine adjustment dials 51, 52 for operating the variable resistors RV1, RV2 for finely adjusting X, Y shifts. The latchings 44, 48 are provided with one-shot multivibrators 53, 54 which receive input signals to the latchings 44, 48 from the matrix circuits 43, 47 and which give operating signals to the latchings 44, 48 some time thereafter to cause them to store signals from the circuits 43, 47. The change-over switches SAB-1 to SAB-5 are operated at the same time by the energization and de-energization of a relay RY2 upon turning on and off of a magnification changing switch Sdu. The switch Sdu is turned on and off by the change of projection lenses 7a, 7b on the turret 57. Thus the shift of the magnification changing lever 21 automatically brings the control circuit of FIG. 8 in such a condition that the desired frame of the film A or B corresponding to the magnification setting can be moved to the projecting position.

The control circuit of FIG. 8 further includes an index frame specifying signal circuit 55 for the film A which is energized by the change-over switch SAB-1 when this switch turns off the switches SX10 to SX18, and an index frame specifying signal circuit 56 for the film B which is energized when the switches SX10 to SX18 are turned off by the switch SAB-1. These circuits 55, 56 are connected via diodes D-10 to D-20 to the latchings 44, 48, respectively, and deliver pulse signals to the latchings 44, 48 when energized, in the same manner as when the signals specifying the index frame G-9 of the film A given by the switches SX9, SYG and the signals specifying the index frame O-18 of the film B given by the switches SX18, SYO are fed from the matrixes 43, 47 to the latchings 44, 48.

The power supply circuit for the switches SX1 to SX18 and SYA to STO includes a safety switch S1a which is closed at all times by a relay RY1 disposed in parallel to the relay RY2 and held energized independently of the magnification changing switch Sdu. The safety switch is held closed while the main switch (not shown) is on.

When the power supply is connected to the control circuit, the relay RY1 is turned on, which in turn closes the safety switch S1a. While no signals are fed to the latchings 44, 48 from the frame specifying switches SX1 to SX18 and SYA to SYO, pulse signals are invariably given to the latchings 44, 48 by the index frame specifying signal circuit 55 or 56 depending on whether the magnification is set for the film A or B, whereby the film carrier 5 is controlled to bring the index frame of the film A or B to the projecting position. For example, when the change-over switch SAB-1 is in the illustrated position (for film B), the pulse generating circuit 56 is energized on application of power, delivering to the latching 44 signals equivalent to those fed out from output terminals D2, D5 of the matrix circuit 43 and giving the latching 48 signals equivalent to those sent out from output terminals D6 to D9 of the matrix circuit 47. Similarly when the change-over switch SAB-1 is in the other position (for the film A), the latching 44 receives signals equivalent to those sent out from output terminals D1 and D4, and the latching 48 receive signals equivalent to those emitted from output terminals D6 to D8. Accordingly the index frame of the selected film A or B is always projected automatically upon the application of power before the desired film is projected or printed, so that the desired frame can be specified easily and correctly for projection or printing, based on the projected index.

When the change-over switches SAB-1 to SAB-5 are operated by the changing switch Sdu to change the magnification, the switch SAB-1 as connected to one of the index frame specifying signal circuits 55, 56 is alternatively connected to the other circuit, which gives the latchings 44, 48 pulse signals for specifying the index frame of the film specified by the change of the magnification. Consequently the index frame is automatically brought to the projecting position invariably when the magnification is changed, in the same manner as above. The desired frame can therefore be specified for projection or printing based on the projected index frame.

Although the embodiment described above is adapted for projection at two different magnifications, the invention can of course be embodied similarly for projection at three or more different magnifications. The frame to be automatically moved to the projecting position upon application of power or change of magnification is not limited to the index frame but can be a specific frame which is selected for convenience according to the contents of the film.

What is claimed is:

1. In a microfilm reader including non-lockable input key means and drive means for moving a microfilm in response to a signal from selected one of the input key means and adapted to automatically transport the microfilm to bring the desired frame of the microfilm to a projecting position by specifying the frame with the input key means, a system for controlling the operation of the drive means comprising:
   a memory circuit for storing the signal from the selected input key means while being energized,
   means for converting the output signal from the memory circuit to an electric signal suited for operating the drive means, and
   signal output means for producing an output signal equivalent to the signal emitted by depressing a specific input key means, upon application of power to the control system in operative relation thereto, whereby the microfilm is automatically transported to a predetermined position upon the application of power while no signal is given by the input key means and the memory circuit for specifying the position of the microfilm.

2. A system as defined in claim 1 wherein the signal output means includes a pulse signal generating circuit for producing a pulse signal when energized after an interruption of power supply, and a circuit for delivering the pulse signal to the converting means in a state equivalent to that resulting from depressing the specific input key means.

3. A system as defined in claim 1 wherein the memory circuit includes a matrix circuit for producing an output signal corresponding to the selected input key means, and the converting means includes at least a digital-analog converter circuit.

4. A system as defined in claim 3 which further comprises a circuit having a comparator for comparing the output value of the digital-analog converter circuit with a comparison signal having varying output values with the operation of the drive means to halt the drive means when the output of the comparator reduces to zero.

5. In a microfilm reader including non-lockable input key means, drive means for moving a microfilm in response to a signal from selected one of the input key means and means for changing the magnification of projection, and adapted to automatically transport the microfilm to bring the desired frame of the microfilm to a projecting position by specifying the frame with the input key means, a system for controlling the operation of the drive means comprising:
   a memory circuit for storing the signal from the selected input key means while being energized until a subsequent input is given to the system,
   means for converting the output signal from the memory circuit to an electric signal suited for operating the drive means, and
   signal output means for producing an output signal equivalent to the signal emitted by depressing a specific input key means, upon changing the magnification in operative relation thereto, whereby the microfilm is automatically transported to a predetermined position upon the change of the magnification while no signal is given by the input key means and the memory circuit for specifying the position of the microfilm.

6. A system as defined in claim 5 wherein the signal output means includes a pulse signal generating circuit for producing a pulse signal when energized, switching means for energizing the pulse generating circuit in operative relation to the change of the magnification, and a circuit for delivering the pulse signal to the converting means in a state equivalent to that resulting from depressing an input key means corresponding to a specific position of the microfilm to be used at the magnification set by the change.

7. A system as defined in claim 5 wherein the memory circuit includes a matrix circuit for producing an output signal corresponding to the selected input means, and the converting means includes at least a digital-analog converter circuit.

8. A system as defined in claim 7 which further comprises a circuit having a comparator for comparing the output value of the digital-analog converter circuit with a comparison signal having varying output values with the operation of the drive means to halt the drive means when the output of the comparator reduces to zero.

9. In a microfilm reader including a plurality of non-lockable input keys, drive means for moving a microfilm in response to a signal from selected one of the input keys and means for changing the magnification of projection, and adapted to automatically transport the microfilm to bring the desired frame of the microfilm to a projecting position by specifying the frame with the input key, a system for controlling the operation of the drive means comprising:
   a memory circuit for storing the signal from the selected input key while being energized until a subsequent input is given to the system,
   means for converting the output signal from the memory circuit to an electric signal suited for operating the drive means, and
   signal output means for automatically producing an output signal equivalent to the signal emitted by depressing a specific input key, upon application of power to the control system and upon changing the magnification while the system is energized in operative relation to the power application or the change of the magnification, whereby the microfilm to be used at a selected magnification is automatically transported to a predetermined position upon the power application and upon the change of the magnification.

10. A system as defined in claim 9 wherein the signal output means includes a change-over switch provided between the control system and its power supply, a magnification changing switch operatively associated with the changing of the magnification, a pulse signal generating circuit connected in series with the change-over switch and with the magnification changing switch for producing a pulse signal, and a circuit for delivering the pulse signal to the converting means in a state in accordance with the selected magnification.

11. A system as defined in claim 9 wherein the memory circuit includes a matrix circuit for producing an output signal corresponding to the selected input key, and the converting means includes at least a digital-analog converter circuit.

12. A system as defined in claim 11 which further comprises a circuit having a comparator for comparing the output value of the digital-analog converter circuit with a comparison signal having varying output values with the operation of the drive means to halt the drive means when the output of the comparator reduces to zero, and a circuit for adjusting the output of the digital-analog converter circuit in accordance with the selected magnification.

13. In a microfilm reader including non-lockable input key means provided in a number usable for one of at least two kinds of microfiche films larger in the number of frames contained therein and drive means for moving a microfilm in response to a signal from selected one of the input key means, a system for controlling the drive means in relation with the signal from the input key means, comprising:

a memory circuit for storing the signal from the selected input key means while being energized, first switching means for opening and closing a circuit for supplying power to a group of input keys included in the input key means and usable only when the microfiche of the larger number of the two is used, second switching means operable in relation with the operation of the first switching means for correcting the output of the memory circuit, and signal generating means for producing an output signal equivalent to the signal emitted by depressing a specific input key, upon application of power to the control system and upon changing-over the first and second switching means while the system is energized, in operative relation thereto.

* * * * *